US012293697B2

(12) United States Patent
Kim et al.

(10) Patent No.: US 12,293,697 B2
(45) Date of Patent: May 6, 2025

(54) METHOD OF COMPRESSING STRESS DATA, ENCODER, DISPLAY DRIVER AND DISPLAY DEVICE

(71) Applicant: Samsung Display Co., LTD., Yongin-si (KR)

(72) Inventors: Hyeonmin Kim, Yongin-si (KR); Yunki Baek, Yongin-si (KR); Jong-Woong Park, Yongin-si (KR); Hye-Sang Park, Yongin-si (KR); Sooyeon Lee, Yongin-si (KR); Wonbok Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/651,869

(22) Filed: May 1, 2024

(65) Prior Publication Data

US 2025/0104601 A1 Mar. 27, 2025

(30) Foreign Application Priority Data

Sep. 27, 2023 (KR) ........................ 10-2023-0130417

(51) Int. Cl.
*G09G 3/20* (2006.01)
*G09G 3/3208* (2016.01)

(52) U.S. Cl.
CPC ......... *G09G 3/2096* (2013.01); *G09G 3/3208* (2013.01); *G09G 2320/0257* (2013.01); *G09G 2320/045* (2013.01); *G09G 2350/00* (2013.01)

(58) Field of Classification Search
CPC ......... G09G 2350/00; G09G 2320/045; G09G 2320/0257; G09G 3/3208
See application file for complete search history.

(56) References Cited

U.S. PATENT DOCUMENTS

| | | | | |
|---|---|---|---|---|
| 7,961,787 | B2 | 6/2011 | Tsai et al. | |
| 2019/0318106 | A1* | 10/2019 | Yu | G08B 13/196 |

FOREIGN PATENT DOCUMENTS

| | | | |
|---|---|---|---|
| KR | 0166716 | B1 | 3/1999 |
| KR | 100688522 | B1 | 3/2007 |
| KR | 100837410 | B1 | 6/2008 |
| KR | 1020180059158 | A | 6/2018 |
| KR | 1020210081677 | A | 7/2021 |

* cited by examiner

*Primary Examiner* — Abbas I Abdulselam
(74) *Attorney, Agent, or Firm* — CANTOR COLBURN LLP

(57) ABSTRACT

In a method of compressing stress data in a display device, the stress data is divided into block stress data for a pixel block, a plurality of compressed codes are generated by encoding the block stress data in a plurality of encoding modes, it is determined whether the plurality of encoding modes are available encoding modes for the block stress data based on code lengths of the plurality of compressed codes and a number of available bits for the pixel block, a final encoding mode is selected among the available encoding modes based on quantization values of the available encoding modes, and a compressed bitstream for the pixel block is generated based on a compressed code corresponding to the final encoding mode among the plurality of compressed codes.

26 Claims, 16 Drawing Sheets

FIG. 2

BSD

| | | | |
|---|---|---|---|
| PX1_SD (24 BITS) | PX2_SD (24 BITS) | PX3_SD (24 BITS) | PX4_SD (24 BITS) |
| PX5_SD (24 BITS) | PX6_SD (24 BITS) | PX7_SD (24 BITS) | PX8_SD (24 BITS) |

FIG. 3

| STRESS DATA FOR SUB-PIXEL | QUANTIZATION VALUE | PCM CODE FOR SUB-PIXEL |
|---|---|---|
| 10101010 (8 BITS) | 0 | 10101010 (8 BITS) |
| | 1 | 1010101 (7 BITS) |
| | 2 | 101010 (6 BITS) |
| | 3 | 10101 (5 BITS) |
| | 4 | 1010 (4 BITS) |
| | 5 | 101 (3 BITS) |
| | 6 | 10 (2 BITS) |
| | 7 | 1 (1 BIT) |

INTRA PREDICTION MODE = 00 (VERTICAL)

INTRA PREDICTION MODE = 01 (HORIZONTAL)

INTRA PREDICTION MODE = 10 (RIGHT-DOWN)

INTRA PREDICTION MODE = 11 (LEFT-DOWN)

FIG. 5

| DPCM CODE (DECIMAL) | ENTROPY CODE (BINARY) | |
|---|---|---|
| | PREFIX | SUFFIX |
| 0 | | 1 |
| 1 | 0 | 10 |
| -1 | 0 | 11 |
| 2 | 00 | 100 |
| -2 | 00 | 101 |

FIG. 7A

BSD

| | | | |
|---|---|---|---|
| PX1_SD (RSD/GSD/BSD = VAL/VAL/VAL) | PX2_SD (RSD/GSD/BSD = VAL/VAL/VAL) | PX3_SD (RSD/GSD/BSD = VAL/VAL/VAL) | PX4_SD (RSD/GSD/BSD = VAL/VAL/VAL) |
| PX5_SD (RSD/GSD/BSD = VAL/VAL/VAL) | PX6_SD (RSD/GSD/BSD = VAL/VAL/VAL) | PX7_SD (RSD/GSD/BSD = VAL/VAL/VAL) | PX8_SD (RSD/GSD/BSD = VAL/VAL/VAL) |

FIG. 7B

BSD

| | | | |
|---|---|---|---|
| PX1_SD (RSD/GSD/BSD = VAL1/VAL2/VAL3) | PX2_SD (RSD/GSD/BSD = VAL1/VAL2/VAL3) | PX3_SD (RSD/GSD/BSD = VAL1/VAL2/VAL3) | PX4_SD (RSD/GSD/BSD = VAL1/VAL2/VAL3) |
| PX5_SD (RSD/GSD/BSD = VAL1/VAL2/VAL3) | PX6_SD (RSD/GSD/BSD = VAL1/VAL2/VAL3) | PX7_SD (RSD/GSD/BSD = VAL1/VAL2/VAL3) | PX8_SD (RSD/GSD/BSD = VAL1/VAL2/VAL3) |

FIG. 8

| MODE NUMBER | ENTROPY CODING | MODE NAME | QUANTIZATION VALUE |
|---|---|---|---|
| 0 | X | COPY | 0 |
| 1 | X | WHITE | 0 |
| 2 | X | CHECK | 0 |
| 3 | 0 | DPCM | 0 |
| | 1 | ENTROPY CODING | |
| 4 | 0 | DPCM | 1 |
| | 1 | ENTROPY CODING | |
| 5 | 0 | DPCM | 2 |
| | 1 | ENTROPY CODING | |
| 6 | 0 | DPCM_D_R | 3 |
| | 1 | ENTROPY CODING | |
| 7 | 0 | DPCM_D_G | 3 |
| | 1 | ENTROPY CODING | |
| 8 | 0 | DPCM_D_B | 3 |
| | 1 | ENTROPY CODING | |
| 9 | 0 | DPCM | 3 |
| | 1 | ENTROPY CODING | |
| 10 | 0 | DPCM_D_R | 4 |
| | 1 | ENTROPY CODING | |
| 11 | 0 | DPCM_D_G | 4 |
| | 1 | ENTROPY CODING | |
| 12 | 0 | DPCM_D_B | 4 |
| | 1 | ENTROPY CODING | |
| 13 | 0 | DPCM | 5 |
| | 1 | ENTROPY CODING | |
| 14 | 0 | DPCM | 6 |
| | 1 | ENTROPY CODING | |
| 15 | X | PCM | 7 |

METHOD OF COMPRESSING STRESS DATA, ENCODER, DISPLAY DRIVER AND DISPLAY DEVICE

This application claims priority to Korean Patent Application No. 10-2023-0130417, filed on Sep. 27, 2023, and all the benefits accruing therefrom under 35 U.S.C. § 119, the content of which in its entirety is herein incorporated by reference.

BACKGROUND

1. Field

Embodiments of the invention relate to a display device, and more particularly to a method of compressing stress data in a display device, an encoder for compressing the stress data, a display driver including the encoder, and a display device including the encoder.

2. Description of the Related Art

As a display device, such as an organic light emitting diode (OLED) display device, operates over time, driving transistors and/or OLEDs of pixels included in the display device may be degraded. If the pixels are degraded, the pixels may not emit light with desired luminance, and image sticking may be perceived in the display device. To reduce or eliminate the image sticking caused by the degradation of the pixels, the display device may store stress data representing accumulated degradation amounts of the pixels, and may compensate input image data based on the stress data.

However, as a resolution of a display panel increases, a size of a stress data memory for storing the stress data is increased.

SUMMARY

Some embodiments provide a method of compressing stress data in a display device.

Some embodiments provide an encoder compressing stress data in a display device.

Some embodiments provide a display driver including the encoder.

Some embodiments provide a display device including the encoder.

According to embodiments, a method of compressing stress data in a display device includes dividing the stress data into block stress data for a pixel block, generating a plurality of compressed codes by encoding the block stress data in a plurality of encoding modes, determining whether the plurality of encoding modes are available encoding modes for the block stress data based on code lengths of the plurality of compressed codes and a number of available bits for the pixel block, selecting a final encoding mode among the available encoding modes based on quantization values of the available encoding modes, and generating a compressed bitstream for the pixel block based on a compressed code corresponding to the final encoding mode among the plurality of compressed codes.

In embodiments, the plurality of encoding modes may differ from each other in at least one selected from an encoding algorithm and a quantization value.

In embodiments, the generating the plurality of compressed codes by encoding the block stress data in the plurality of encoding modes may include generating a pulse code modulation (PCM) code, as one of the plurality of compressed codes, by performing a quantization operation on the block stress data.

In embodiments, the generating the plurality of compressed codes by encoding the block stress data in the plurality of encoding modes may include generating a predictive PCM code based on reconstructed block stress data for an adjacent pixel block adjacent to the pixel block, and generating a differential PCM (DPCM) code, as one of the plurality of compressed codes, based on the PCM code and the predictive PCM code.

In embodiments, the generating the plurality of compressed codes by encoding the block stress data in the plurality of encoding modes may include generating an entropy code, as one of the plurality of compressed codes, by performing entropy coding on the DPCM code.

In embodiments, the method may further include determining whether a copy mode is an available encoding mode by comparing a code length of the entropy code with a number of sub-pixels included in the pixel block.

In embodiments, the DPCM code for the pixel block may include a first color DPCM code for first color sub-pixels included in the pixel block, a second color DPCM code for second color sub-pixels included in the pixel block, and a third color DPCM code for third color sub-pixels included in the pixel block. In such embodiments, the generating the plurality of compressed codes by encoding the block stress data in the plurality of encoding modes may further include generating a first difference DPCM code by subtracting the first color DPCM code from the second color DPCM code, generating a second difference DPCM code by subtracting the first color DPCM code from the third color DPCM code, and generating, as one of the plurality of compressed codes, a color difference DPCM code including the first color DPCM code, the first difference DPCM code and the second difference DPCM code.

In embodiments, the number of available bits for the pixel block may correspond to a sum of a number of unused bits for a previous pixel block and a number of bits allocated to the pixel block.

In embodiments, the number of bits allocated to the pixel block may be determined based on a number of bits of the block stress data and a target compression rate.

In embodiments, the determining whether the plurality of encoding modes are the available encoding modes may include with respect to an encoding mode among the plurality of encoding modes, comparing a code length of a compressed code corresponding to the encoding mode among the plurality of compressed codes with the number of available bits, determining that the encoding mode is an available encoding mode when the code length is less than or equal to the number of available bits, and determining that the encoding mode is not the available encoding mode when the code length is greater than the number of available bits.

In embodiments, the method may further include determining whether the block stress data is specific pattern data.

In embodiments, the specific pattern data may include at least one selected from white pattern data having a same value for all sub-pixels included in the pixel block, and check pattern data having a same value for same color sub-pixels included in the pixel block.

In embodiments, the selecting the final encoding mode may include selecting an available encoding mode having a lowest quantization value among the available encoding modes as the final encoding mode.

In embodiments, the selecting the final encoding mode may include checking a lowest quantization value among the quantization values of the available encoding modes, comparing a difference between a previous quantization value of a final encoding mode for a previous pixel block and the lowest quantization value with a reference quantization difference value, selecting an available encoding mode having the lowest quantization value among the available encoding modes as the final encoding mode when a value obtained by subtracting the lowest quantization value from the previous quantization value is less than or equal to the reference quantization difference value, and selecting an available encoding mode having a quantization value higher than the lowest quantization value among the available encoding modes as the final encoding mode when the value obtained by subtracting the lowest quantization value from the previous quantization value is greater than the reference quantization difference value.

In embodiments, the compressed bitstream for the pixel block may include a mode bit representing the final encoding mode.

In embodiments, when the final encoding mode is a PCM mode, the compressed bitstream may further include a PCM code having one bit for each sub-pixel included in the pixel block.

In embodiments, when the final encoding mode is a DPCM mode, the compressed bitstream may further include an intra prediction mode bit representing a direction in which a DPCM code is calculated, and the DPCM code having two bits for each sub-pixel included in the pixel block.

In embodiments, when the final encoding mode is an entropy coding mode, the compressed bitstream may further include an intra prediction mode bit representing a direction in which a DPCM code is calculated, and an entropy code which is generated by performing entropy coding on the DPCM code and has variable bits for each sub-pixel included in the pixel block.

In embodiments, when a code length of an entropy code generated by encoding the block stress data in an entropy coding mode among the plurality of encoding modes is equal to a number of sub-pixels included in the pixel block, the final encoding mode may be determined as a copy mode. In such embodiments, when the final encoding mode is the copy mode, the compressed bitstream may include only the mode bit and an intra prediction mode bit.

In embodiments, when the block stress data is white pattern data having a same value with respect to all sub-pixels included in the pixel block, the final encoding mode may be determined as a white mode. In such embodiments, when the final encoding mode is the white mode, the compressed bitstream may further include a value bit representing the same value.

In embodiments, when the block stress data is check pattern data having a same first value with respect to first color sub-pixels included in the pixel block, a same second value with respect to second color sub-pixels included in the pixel block and a same third value with respect to third color sub-pixels included in the pixel block, the final encoding mode may be determined as a check mode. In such embodiments, when the final encoding mode is the check mode, the compressed bitstream may further include a first value bit representing the same first value, a second value bit representing the same second value and a third value bit representing the same third value.

According to embodiments, an encoder, which compresses stress data in a display device, includes a plurality of encoding circuits which generates a plurality of compressed codes by encoding block stress data for a pixel block in a plurality of encoding modes, a rate control circuit which determines whether the plurality of encoding modes are available encoding modes for the block stress data based on code lengths of the plurality of compressed codes and a number of available bits for the pixel block, and selects a final encoding mode among the available encoding modes based on quantization values of the available encoding modes, and a bitstream generation circuit which generates a compressed bitstream for the pixel block based on a compressed code corresponding to the final encoding mode among the plurality of compressed codes.

In embodiments, the plurality of encoding circuits may include a pulse code modulation (PCM) circuit which generates a PCM code as one of the plurality of compressed codes by performing a quantization operation on the block stress data, a differential PCM (DPCM) DPCM circuit which generates a DPCM code as one of the plurality of compressed codes based on the PCM code and a predictive PCM code, and an entropy coding circuit which generates an entropy code as one of the plurality of compressed codes by performing entropy coding on the DPCM code.

In embodiments, the encoder may further include a pattern determination circuit which determines whether the block stress data is at least one selected from white pattern data having a same value for all sub-pixels included in the pixel block, and check pattern data having a same value for same color sub-pixels included in the pixel block.

According to embodiments, a display driver of a display device includes a stress data generation circuit which generates stress data by accumulating input image data, an encoder which generates a compressed bitstream by encoding the stress data, a stress data memory which stores the compressed bitstream, a decoder which restores the stress data by decoding the compressed bitstream stored in the stress data memory, a data compensation circuit which generates output image data by compensating the input image data based on the restored stress data, and a data driver which provides data signals to a plurality of pixels of the display device based on the output image data. In such embodiments, the stress data is divided into block stress data for each pixel block. In such embodiments, the encoder includes a plurality of encoding circuits which generates a plurality of compressed codes by encoding the block stress data in a plurality of encoding modes, a rate control circuit which determines whether the plurality of encoding modes are available encoding modes for the block stress data based on code lengths of the plurality of compressed codes and a number of available bits for the pixel block, and selects a final encoding mode among the available encoding modes based on quantization values of the available encoding modes, and a bitstream generation circuit which generates the compressed bitstream for the pixel block based on a compressed code corresponding to the final encoding mode among the plurality of compressed codes.

According to embodiments, a display device includes a display panel including a plurality of pixels, a scan driver which provides scan signals to the plurality of pixels, a stress data generation circuit which generates stress data by accumulating input image data, an encoder which generates a compressed bitstream by encoding the stress data, a stress data memory which stores the compressed bitstream, a decoder which restores the stress data by decoding the compressed bitstream stored in the stress data memory, a data compensation circuit which generates output image data by compensating the input image data based on the restored stress data, and a data driver which provides data signals to the plurality of pixels based on the output image data. In such embodiments, the stress data is divided into block stress data for each pixel block. In such embodiments, the encoder includes a plurality of encoding circuits which generates a plurality of compressed codes by encoding the block stress data in a plurality of encoding modes, a rate control circuit which determines whether the plurality of encoding modes are available encoding modes for the block stress data based on code lengths of the plurality of compressed codes and a number of available bits for the pixel block, and selects a final encoding mode among the available encoding modes based on quantization values of the available encoding modes, and a bitstream generation circuit which generates the compressed bitstream for the pixel block based on a compressed code corresponding to the final encoding mode among the plurality of compressed codes.

As described above, in a method of compressing stress data, an encoder, a display driver and a display device according to embodiments, block stress data for each pixel block may be compressed in an optimal encoding mode among a plurality of encoding modes. Further, when the block stress data is specific pattern data, a compress bitstream containing a specific value rather than a compressed code may be generated. Accordingly, a size of a stress data memory may be minimized while minimizing a data loss of stress data.

BRIEF DESCRIPTION OF THE DRAWINGS

Illustrative, non-limiting Embodiments will be more clearly understood from the following detailed description in conjunction with the accompanying drawings.

FIG. 2 is a diagram illustrating an example of block stress data for each pixel block.

FIG. 3 is a diagram for describing an example of a pulse code modulation (PCM) mode as an encoding mode.

FIG. 5 is a diagram for describing an example of an entropy coding mode as an encoding mode.

FIG. 7A is a diagram illustrating an example of block stress data that is white pattern data, and FIG. 7B is a diagram illustrating an example of block stress data that is check pattern data.

FIG. 8 is a diagram for describing an example of a plurality of encoding modes used in a method of compressing stress data according to embodiments.

DETAILED DESCRIPTION

Figure 1:
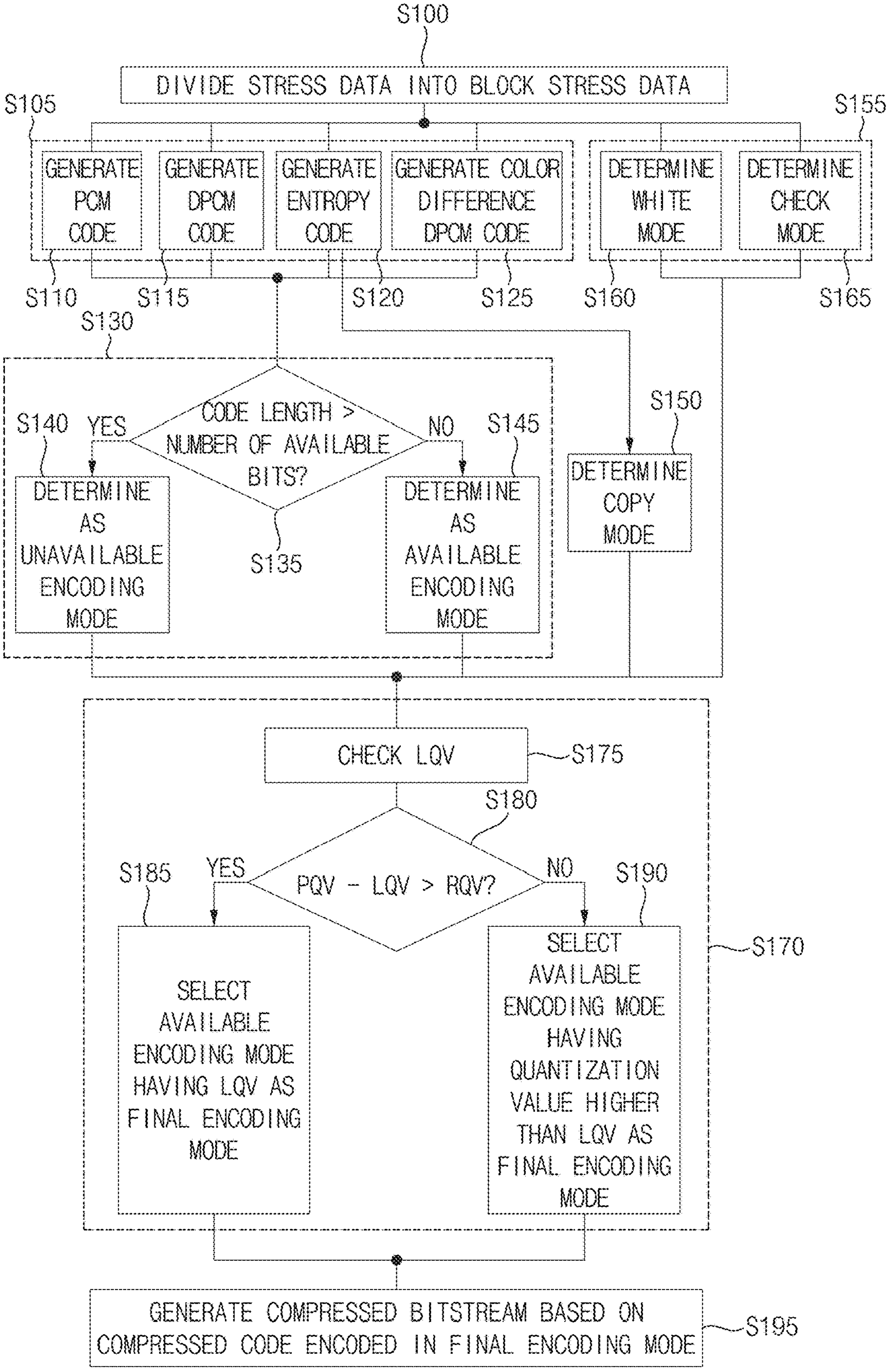
FIG. 1 is a flowchart illustrating a method of compressing stress data in a display device according to embodiments.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a" "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

Figure 6A:
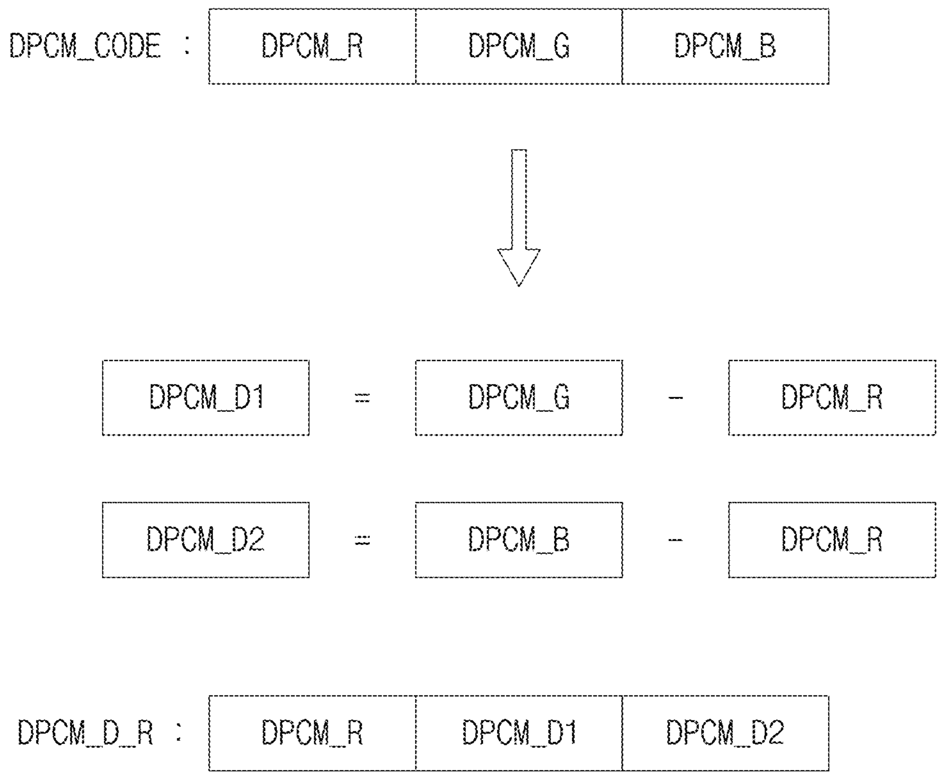
FIGS. 6A to 6C are diagrams for describing examples of a color difference DPCM mode as an encoding mode.
Figure 6B:
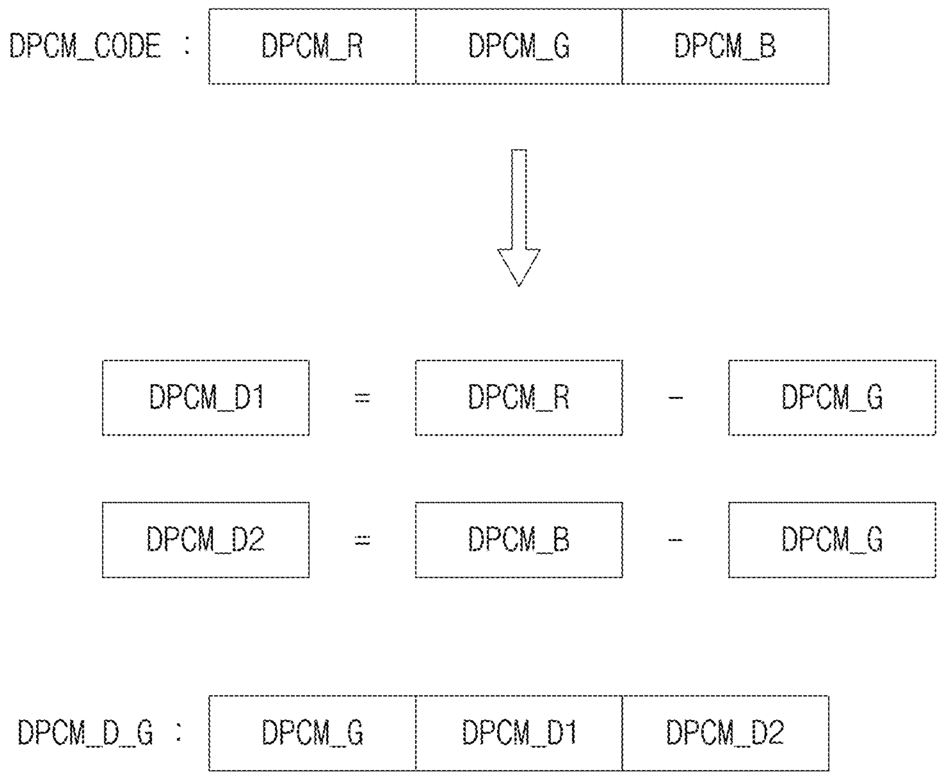
Figure 6C:
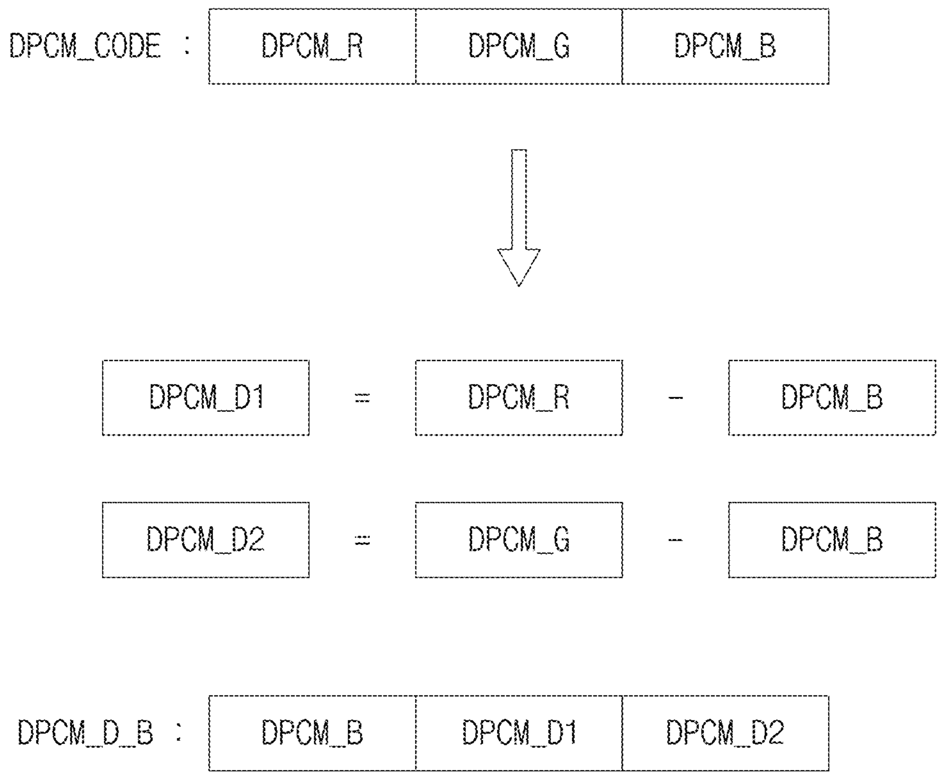
Figure 9:
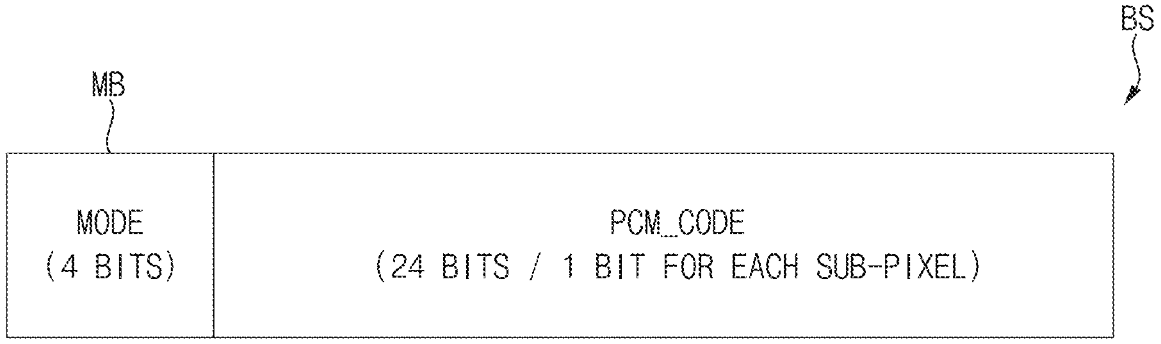
FIG. 9 is a diagram illustrating an example of a compressed bitstream in a case where a PCM mode is selected.
Figure 10:
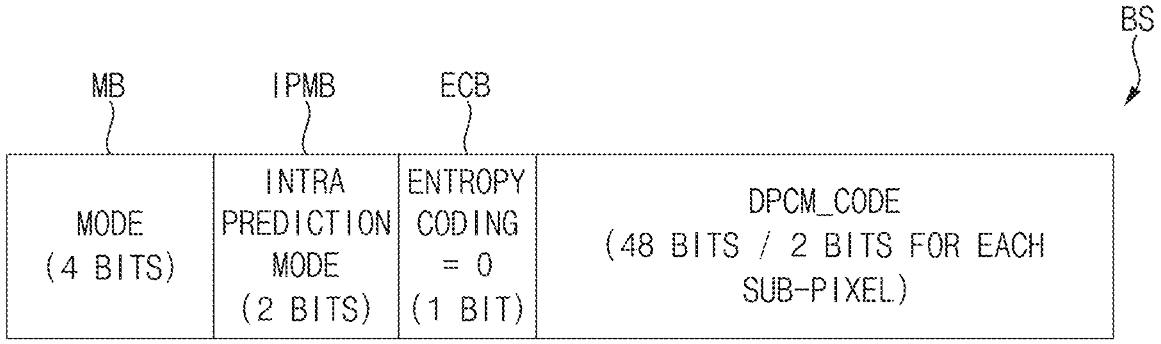
FIG. 10 is a diagram illustrating an example of a compressed bitstream in a case where a DPCM mode is selected.
Figure 11:
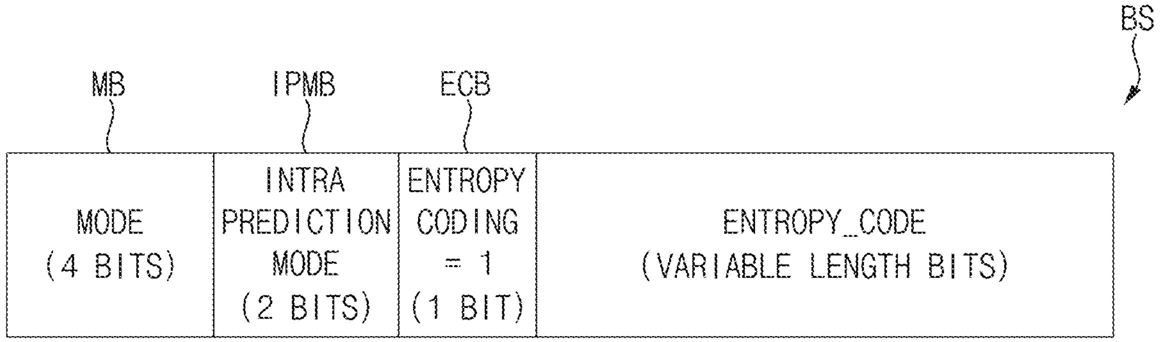
FIG. 11 is a diagram illustrating an example of a compressed bitstream in a case where an entropy coding mode is selected.
Figure 12:
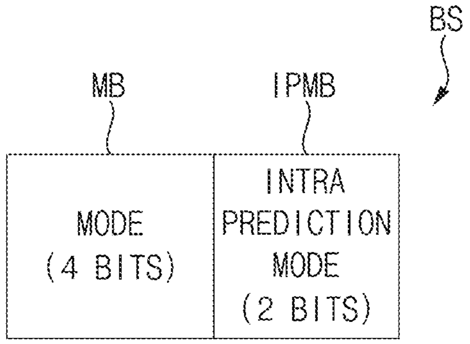
FIG. 12 is a diagram illustrating an example of a compressed bitstream in a case where a copy mode is selected.
Figure 13:
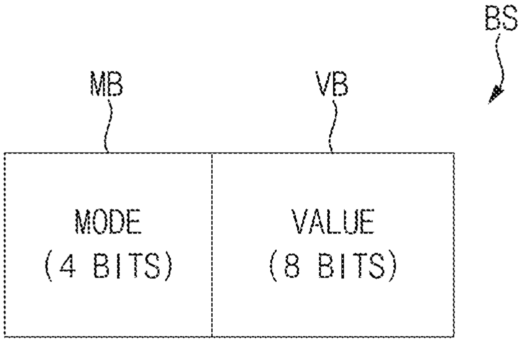
FIG. 13 is a diagram illustrating an example of a compressed bitstream in a case where a white mode is selected.
Figure 14:
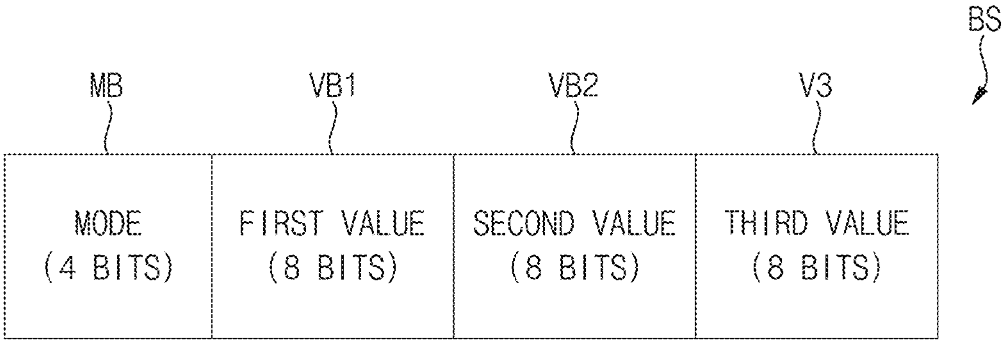
FIG. 14 is a diagram illustrating an example of a compressed bitstream in a case where a check mode is selected.

FIG. 1 is a flowchart illustrating a method of compressing stress data in a display device according to embodiments, FIG. 2 is a diagram illustrating an example of block stress data for each pixel block, FIG. 3 is a diagram for describing an example of a pulse code modulation (PCM) mode as an encoding mode, FIGS. 4A through 4E are diagrams for describing examples of a differential PCM (DPCM) mode as an encoding mode, FIG. 5 is a diagram for describing an example of an entropy coding mode as an encoding mode, FIGS. 6A to 6C are diagrams for describing examples of a color difference DPCM mode as an encoding mode, FIG. 7A is a diagram illustrating an example of block stress data that is white pattern data, FIG. 7B is a diagram illustrating an example of block stress data that is check pattern data, FIG. 8 is a diagram for describing an example of a plurality of encoding modes used in a method of compressing stress data according to embodiments, FIG. 9 is a diagram illustrating an example of a compressed bitstream in a case where a PCM mode is selected, FIG. 10 is a diagram illustrating an example of a compressed bitstream in a case where a DPCM mode is selected, FIG. 11 is a diagram illustrating an example of a compressed bitstream in a case where an entropy coding mode is selected, FIG. 12 is a diagram illustrating an example of a compressed bitstream in a case where a copy mode is selected, FIG. 13 is a diagram illustrating an example of a compressed bitstream in a case where a white mode is selected, and FIG. 14 is a diagram illustrating an example of a compressed bitstream in a case where a check mode is selected.

Referring to FIG. 1, in a method of compressing stress data in a display device according to embodiments, the stress data may be divided into block stress data for each pixel block (S100). In an embodiment, for example, as illustrated in FIG. 2, each pixel block may include first through eighth pixels, which may be arranged in two adjacent rows (e.g., in a 2×4 matrix form), and the block stress data BSD for a pixel block may include the stress data PX1_SD, PX2_SD, PX3_SD, PX4_SD, PX5_SD, PX6_SD, PX7_SD and PX8_SD for the first through eighth pixels. In an embodiment, each pixel may include three sub-pixels (e.g., red, green, and blue sub-pixels), the stress data for each sub-pixel may have eight bits, and the stress data PX1_SD through PX8_SD for each pixel may have twenty-four bits. In such an embodiment, the block stress data BSD before compression may have one hundred ninety-two bits. Although FIG. 2 illustrates an example in which the block stress data BSD includes the stress data PX1_SD through PX8_SD for eight pixels, each block stress data BSD according to embodiments is limited to the example of FIG. 2.

In an embodiment, a plurality of compressed codes may be generated by encoding the block stress data BSD in a plurality of encoding modes (S105) as shown in FIG. 1. In some embodiments, the plurality of encoding modes may differ from each other in at least one selected from an encoding algorithm and a quantization value. In an embodiment, for example, the plurality of encoding modes may be encoding modes having different encoding algorithms, and may include, but is not limited to, a pulse code modulation (PCM) mode, a differential PCM (DPCM) mode, an entropy coding (e.g., Golomb coding) mode and a color difference DPCM mode as illustrated in FIGS. 1 and 8. In some embodiments, the plurality of encoding modes may further include a run length coding mode, a Huffman coding mode, an adaptive differential pulse code modulation (ADPCM) mode, etc. Further, the plurality of encoding modes may be encoding modes having different quantization values, and may include the DPCM modes and the entropy coding modes having quantization values from zero to six as illustrated in FIG. 8.

In some embodiments, as one of the plurality of compressed codes, a PCM code may be generated by performing a quantization operation on the block stress data BSD (S110) as shown in FIG. 1. Here, the quantization operation may be an operation of removing a number of lower bits corresponding to a quantization value from the stress data for each sub-pixel included in the block stress data BSD.

In an embodiment, for example, as illustrated in FIG. 3, in a case where original stress data for each sub-pixel has eight bits, the PCM code with a quantization value of 0 may be substantially the same as the original stress data. In such an embodiment, by the quantization operation with a quantization value of 1, a lower one bit of the original stress data may be removed, and the PCM code with the quantization value of 1 may have upper seven bits of the original stress data. In such an embodiment, by the quantization operation with a quantization value of 2, lower two bits of the original stress data may be removed, and the PCM code with the quantization value of 2 may have upper six bits of the original stress data. In such an embodiment, by the quantization operation with a quantization value of 7, lower seven bits of the original stress may be removed, and the PCM code with the quantization value of 7 may have upper one bit of the original stress data.

In an embodiment, as one of the plurality of compressed codes, a DPCM code may be generated based on the PCM code and a predictive PCM code (S115) as shown in FIG. 1. In some embodiments, the predictive PCM code of a pixel block may be generated based on reconstructed block stress data for an adjacent pixel block, which is adjacent to the pixel block, and the DPCM code for each pixel in the pixel block may be generated by subtracting the predictive PCM code (or the PCM code) for an adjacent pixel from the PCM code for the pixel.

Figure 4A:
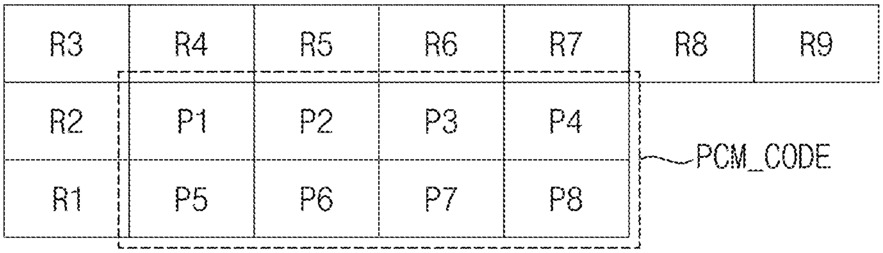
FIGS. 4A through 4E are diagrams for describing examples of a differential PCM (DPCM) mode as an encoding mode.

In an embodiment, for example, as illustrated in FIG. 4A, the PCM code PCM_CODE for the pixel block may include first through eighth pixel PCM codes P1, P2, P3, P4, P5, P6, P7 and P8 for first through eighth pixels therein. In such an embodiment, a reconstruction circuit 222 illustrates in FIG. 15 may generate reconstructed block stress data RBSD for the adjacent pixel block by reconstructing a compressed bitstream BS (or the DPCM code DPCM_CODE) for the adjacent pixel block. A prediction circuit 224 illustrated in FIG. 15 may determine one of a vertical direction, a horizontal direction, a right-down direction and a left-down direction as a direction in which the DPCM code DPCM_CODE for the pixel block is calculated. Here, an intra prediction mode may represent the direction in which the DPCM code DPCM_CODE is calculated.

Figure 4B:
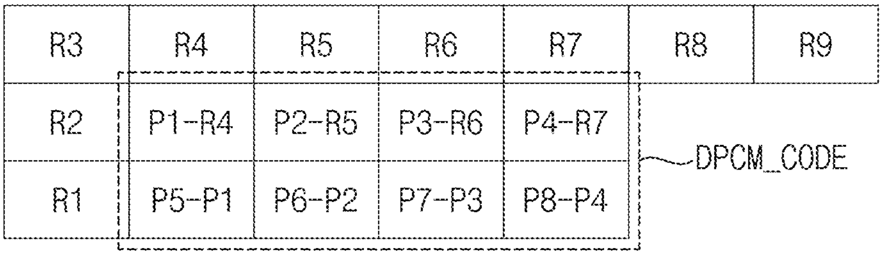
Figure 15:
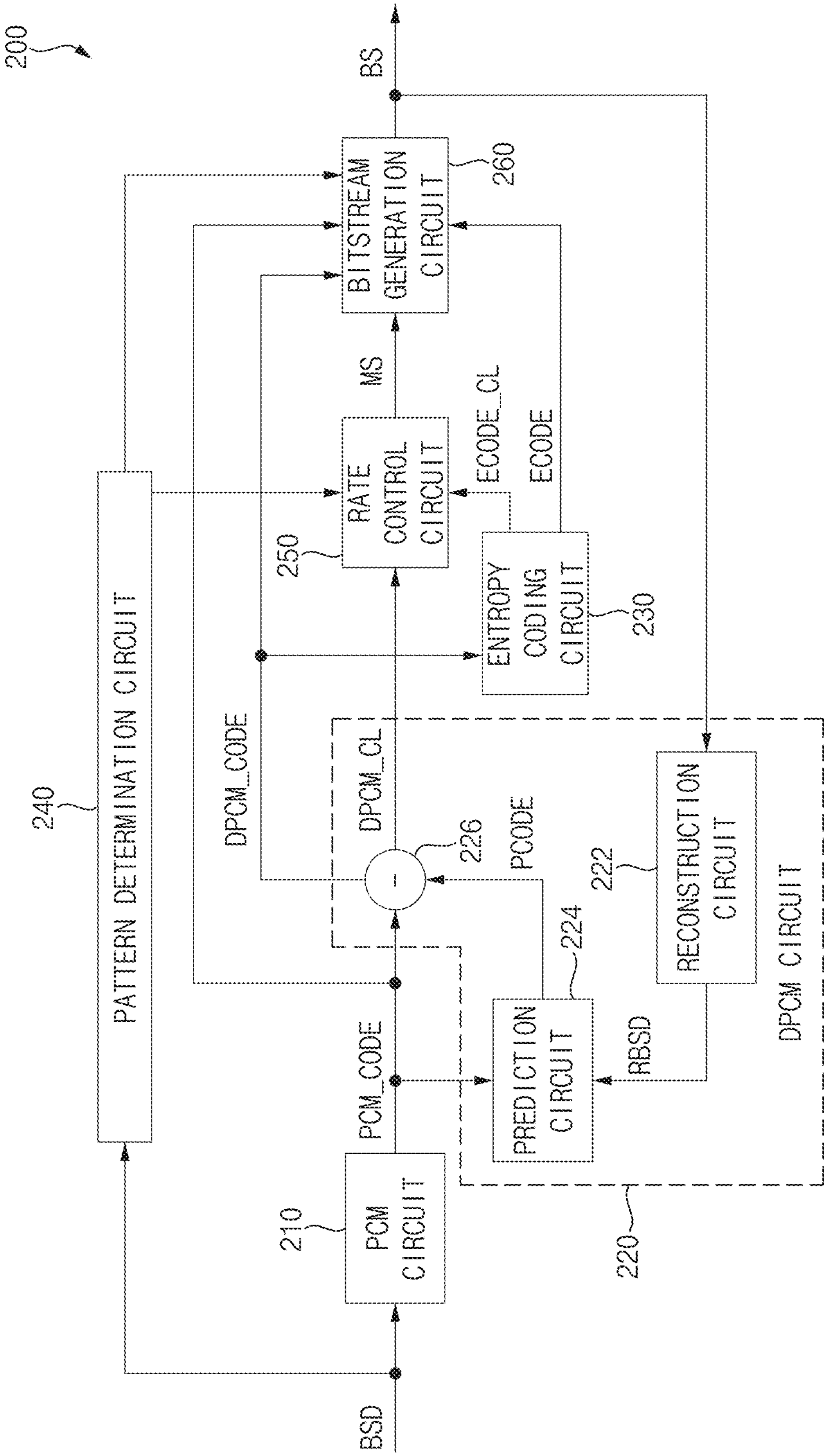
FIG. 15 is a block diagram illustrating an encoder compressing stress data in a display device according to embodiments.

When the vertical direction is determined as the direction in which the DPCM code DPCM_CODE is calculated, as illustrated in FIG. 4B, the prediction circuit 224 illustrated in FIG. 15 may provide a subtractor 226 illustrated in FIG. 15 with the intra prediction mode having a value of '00' and the predictive PCM code PCODE including fourth through seventh reference PCM codes R4, R5, R6 and R7 that are adjacent to the PCM code PCM_CODE in the vertical direction. In this case, the DPCM code DPCM_CODE for the first pixel may be calculated by subtracting the fourth reference PCM code R4 from the first pixel PCM code P1, the DPCM code DPCM_CODE for the second pixel may be calculated by subtracting the fifth reference PCM code R5 from the second pixel PCM code P2, the DPCM code DPCM_CODE for the third pixel may be calculated by subtracting the sixth reference PCM code R6 from the third pixel PCM code P3, the DPCM code DPCM_CODE for the fourth pixel may be calculated by subtracting the seventh reference PCM code R7 from the fourth pixel PCM code P4, the DPCM code DPCM_CODE for the fifth pixel may be calculated by subtracting the first pixel PCM code P1 from the fifth pixel PCM code P5, the DPCM code DPCM_CODE for the sixth pixel may be calculated by subtracting the second pixel PCM code P2 from the sixth pixel PCM code P6, the DPCM code DPCM_CODE for the seventh pixel may be calculated by subtracting the third pixel PCM code P3 from the seventh pixel PCM code P7, and the DPCM code DPCM_CODE for the eighth pixel may be calculated by subtracting the fourth pixel PCM code P4 from the eighth pixel PCM code.

Figure 4C:
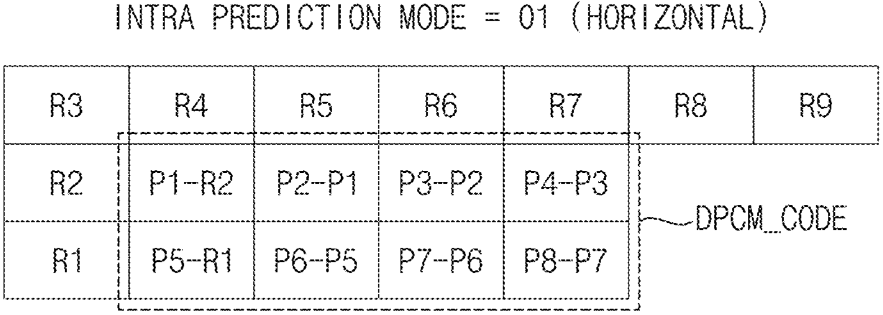

In an embodiment, when the horizontal direction is determined as the direction in which the DPCM code DPCM_CODE is calculated, as illustrated in FIG. 4C, the prediction circuit 224 illustrated in FIG. 15 may provide the subtractor 226 illustrated in FIG. 15 with the intra prediction mode having a value of '01' and the predictive PCM code PCODE including first and second reference PCM codes R1 and R2 that are adjacent to the PCM code PCM_CODE in the horizontal direction. In this case, the DPCM code DPCM_CODE for the first pixel may be calculated by subtracting the second reference PCM code R2 from the first pixel PCM code P1, the DPCM code DPCM_CODE for the second pixel may be calculated by subtracting the first pixel PCM code P1 from the second pixel PCM code P2, the DPCM code DPCM_CODE for the third pixel may be calculated by subtracting the second pixel PCM code P2 from the third pixel PCM code P3, the DPCM code DPCM_CODE for the fourth pixel may be calculated by subtracting the third pixel PCM code P3 from the fourth pixel PCM code P4, the DPCM code DPCM_CODE for the fifth pixel may be calculated by subtracting the first reference PCM code R1 from the fifth pixel PCM code P5, the DPCM code DPCM_CODE for the sixth pixel may be calculated by subtracting the fifth pixel PCM code P5 from the sixth pixel PCM code P6, the DPCM code DPCM_CODE for the seventh pixel may be calculated by subtracting the sixth pixel PCM code P6 from the seventh pixel PCM code P7, and the DPCM code DPCM_CODE for the eighth pixel may be calculated by subtracting the seventh pixel PCM code P7 from the eighth pixel PCM code P8.

Figure 4D:
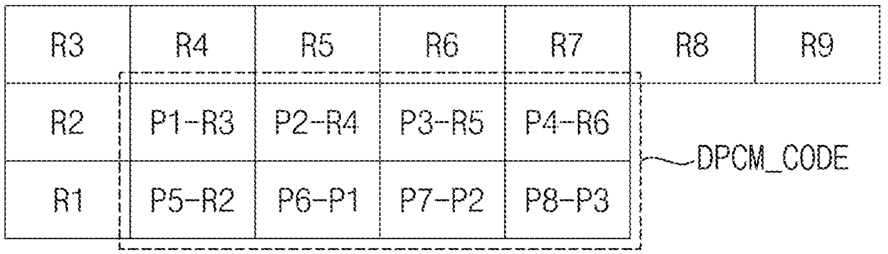

In an embodiment, when the right-down direction is determined as the direction in which the DPCM code DPCM_CODE is calculated, as illustrated in FIG. 4D, the prediction circuit 224 illustrated in FIG. 15 may provide the subtractor 226 illustrated in FIG. 15 with the intra prediction mode having a value of '10' and the predictive PCM code PCODE including second through sixth reference PCM codes R2, R3, R4, R5 and R6 that are adjacent to the PCM code PCM_CODE in the right-down direction (or a left-up direction). In this case, the DPCM code DPCM_CODE for the first pixel may be calculated by subtracting the third reference PCM code R3 from the first pixel PCM code P1, the DPCM code DPCM_CODE for the second pixel may be calculated by subtracting the fourth reference PCM code R4 from the second pixel PCM code P2, the DPCM code DPCM_CODE for the third pixel may be calculated by subtracting the fifth reference PCM code R5 from the third pixel PCM code P3, the DPCM code DPCM_CODE for the fourth pixel may be calculated by subtracting the sixth reference PCM code R6 from the fourth pixel PCM code P4, the DPCM code DPCM_CODE for the fifth pixel may be calculated by subtracting the second reference PCM code R2 from the fifth pixel PCM code P5, the DPCM code DPCM_CODE for the sixth pixel may be calculated by subtracting the first pixel PCM code P1 from the sixth pixel PCM code P6, the DPCM code DPCM_CODE for the seventh pixel may be calculated by subtracting the second pixel PCM code P2 from the seventh pixel PCM code P7, and the DPCM code DPCM_CODE for the eighth pixel may be calculated by subtracting the third pixel PCM code P3 from the eighth pixel PCM code P8.

Figure 4E:
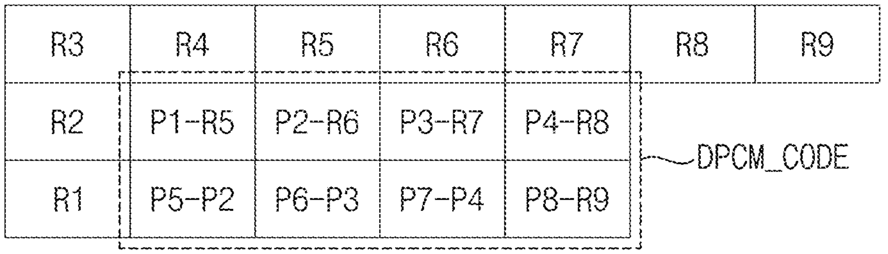

In an embodiment, when the left-down direction is determined as the direction in which the DPCM code DPCM_CODE is calculated, as illustrated in FIG. 4E, the prediction circuit 224 illustrated in FIG. 15 may provide the subtractor 226 illustrated in FIG. 15 with the intra prediction mode having a value of '11' and the predictive PCM code PCODE including fifth through ninth reference PCM codes R5, R6, R7, R8 and R9 that are adjacent to the PCM code PCM_CODE in the left-down direction (or a right-up direction). In this case, the DPCM code DPCM_CODE for the first pixel may be calculated by subtracting the fifth reference PCM code R5 from the first pixel PCM code P1, the DPCM code DPCM_CODE for the second pixel may be calculated by subtracting the sixth reference PCM code R6 from the second pixel PCM code P2, the DPCM code DPCM_CODE for the third pixel may be calculated by subtracting the seventh reference PCM code R7 from the third pixel PCM code P3, the DPCM code DPCM_CODE for the fourth pixel may be calculated by subtracting the eighth reference PCM code R8 from the fourth pixel PCM code P4, the DPCM code DPCM_CODE for the fifth pixel may be calculated by subtracting the second pixel PCM code P2 from the fifth pixel PCM code P5, the DPCM code DPCM_CODE for the sixth pixel may be calculated by subtracting the third pixel PCM code P3 from the sixth pixel PCM code P6, the DPCM code DPCM_CODE for the seventh pixel may be calculated by subtracting the fourth pixel PCM code P4 from the seventh pixel PCM code P7, and the DPCM code DPCM_CODE for the eighth pixel may be calculated by subtracting the ninth reference PCM code R9 from the eighth pixel PCM code P8. Since the DPCM code DPCM_CODE for the eighth pixel is generated before the PCM code for a pixel directly adjacent to the eighth pixel in the right-up direction is generated, the DPCM code DPCM_CODE for the eighth pixel may be generated using the ninth reference PCM code R9 instead of the PCM code for the pixel directly adjacent to the eighth pixel in the right-up direction.

In an embodiment, as one of the plurality of compressed codes, an entropy code may be generated by performing entropy coding on the DPCM code DPCM_CODE (S120) as shown in FIG. 1. In some embodiments, the entropy coding may be, but is not limited to, Golomb coding.

In an embodiment, for example, as illustrated in FIG. 5, the entropy code may be divided into a prefix PREFIX and a suffix SUFFIX, and a length of the suffix SUFFIX may be greater by one than a length of the prefix PREFIX. Thus, for each sub-pixel, the DPCM code DPCM_CODE of '0' in decimal may be encoded to an entropy code having no prefix PREFIX and a suffix SUFFIX of '1' in binary, the DPCM code DPCM_CODE of '1' in decimal may be encoded to an entropy code having a prefix PREFIX of '0' in binary and a suffix SUFFIX of '10' in binary, the DPCM code DPCM_CODE of '−1' in decimal may be encoded to an entropy code having a prefix PREFIX of '0' in binary and a suffix SUFFIX of '1' in binary, the DPCM code DPCM_CODE is '2' in decimal may be encoded to an entropy code having a prefix PREFIX of '00' in binary and a suffix SUFFIX of '100' in binary, and the DPCM code DPCM_CODE of '−2' in decimal may be encoded as an entropy code having a prefix PREFIX of '00' in binary and a suffix of '101' in binary. Thus, in a case where the DPCM code DPCM_CODE has a value of '0', for each sub-pixel, although the DPCM code DPCM_CODE has four bits, the entropy code may have only one bit with a value of '1'. Therefore, for the sub-pixel, the number of bits of the entropy code may be reduced by three bits compared with the number of bits of the DPCM code DPCM_CODE.

In an embodiment, as one of the plurality of compressed codes, a color difference DPCM code may be generated by calculating differences between the DPCM code DPCM_CODE for a reference color and the DPCM codes DPCM_CODE for other colors (S125) as shown in FIG. 1. In some embodiments, as illustrated in FIGS. 6A through 6C, the DPCM code DPCM_CODE for the pixel block may include a first color DPCM code (e.g., red DPCM code DPCM_R) for first color sub-pixels (e.g., red sub-pixels) included in the pixel block, a second color DPCM code (e.g., green DPCM code DPCM_G) for second color sub-pixels (e.g., green sub-pixels) included in the pixel block, and a third color DPCM code (e.g., blue DPCM code DPCM_B) for third color sub-pixels (e.g., blue sub-pixels) included in the pixel block. In this case, to generate the color difference DPCM code, a first difference DPCM code may be generated by subtracting the first color DPCM code from the second color DPCM code, a second difference DPCM code may be generated by subtracting the first color DPCM code from the third color DPCM code, and the color difference DPCM code including the first color DPCM code, the first difference DPCM code and the second difference DPCM code may be generated.

In an embodiment, for example, as illustrated in FIG. 6A, a first difference DPCM code DPCM_D1 may be generated by subtracting the red DPCM code DPCM_R for the red sub-pixels from the green DPCM code DPCM_G for the green sub-pixels, and a second difference DPCM code DPCM_D2 may be generated by subtracting the red DPCM code DPCM_R for the red sub-pixels from the blue DPCM code DPCM_B for the blue sub-pixels. The color difference DPCM code DPCM_D_R based on the red DPCM code DPCM_R may include the red DPCM code DPCM_R, the first difference DPCM code DPCM_D1 and the second difference DPCM code DPCM_D2.

In another embodiment, for example, as illustrated in FIG. 6B, a first difference DPCM code DPCM_D1 may be generated by subtracting the green DPCM code DPCM_G for the green sub-pixels from the red DPCM code DPCM_R for the red sub-pixels, and a second difference DPCM code DPCM_D2 may be generated by subtracting the green DPCM code DPCM_G for the green sub-pixels from the blue DPCM code DPCM_B for the blue sub-pixels. The color difference DPCM code DPCM_D_G based on the green DPCM code DPCM_G may include the green DPCM code DPCM_G, the first difference DPCM code DPCM_D1 and the second difference DPCM code DPCM_D2.

In still another embodiment, for example, as illustrated in FIG. 6C, a first difference DPCM code DPCM_D1 may be generated by subtracting the blue DPCM code DPCM_B for the blue sub-pixels from the red DPCM code DPCM_R for the red sub-pixels, and a second difference DPCM code DPCM_D2 may be generated by subtracting the blue DPCM code DPCM_B for the blue sub-pixels from the green DPCM code DPCM_G for the green sub-pixels. The color difference DPCM code DPCM_D_B based on the blue DPCM code DPCM_B may include the blue DPCM code DPCM_B, the first difference DPCM code DPCM_D1 and the second difference DPCM code DPCM_D2.

In an embodiment, it may be determined whether the plurality of encoding modes are available encoding modes for the block stress data BSD based on code lengths of the plurality of compressed codes and the number of available bits for the pixel block (S130), as shown in FIG. 1. In some embodiments, the number of available bits for the pixel block may correspond to a sum of the number of unused bits for a previous pixel block and the number of bits allocated to the pixel block. That is, the number of unused bits for the previous pixel block may be added to the number of available bits for a current pixel block. Accordingly, fewer bits may be used to compress the pixel block with low complexity, and more bits may be used to compress the pixel block with high complexity. Further, the number of bits allocated to each pixel block may be determined based on the number of bits of each block stress data BSD and a target compression rate. For example, if the block stress data BSD has one hundred ninety-two bits and the target compression ratio is 1/4, forty-eight bits may be allocated to each pixel block.

In some embodiments, for at least one encoding mode of the plurality of encoding modes, the code length of the compressed code (e.g., the DPCM code DPCM_CODE, the entropy code or the color difference DPCM code DPCM_D_R, DPCM_D_G and DPCM_D_B) corresponding to the encoding mode (e.g., the DPCM mode, the entropy coding mode or the color difference DPCM mode) may be compared with the number of available bits (S135). If the code length is greater than the number of available bits (S135: YES), the encoding mode may be determined to be an encoding mode that is unavailable for the block stress data BSD (S140). If the code length is less than or equal to the number of available bits (S135: NO), it may be determined that the encoding mode is the available encoding mode for the block stress data BSD (S145).

In some embodiments, the plurality of encoding modes may further include a copy mode. In a case where the entropy code has one bit for each of all sub-pixels, the block stress data BSD may be encoded in the copy mode. Thus, it may be determined whether the copy mode is the available encoding mode by comparing the code length of the entropy code with the number of sub-pixels included in the pixel block (S150). If the code length of the entropy code is equal to the number of sub-pixels, this means that the entropy code has one bit for each of all sub-pixels, and thus it may be determined that the copy mode is the available encoding mode for the block stress data BSD. In this case, that the entropy code has one bit for each of all sub-pixels may mean that the DPCM code DPCM_CODE for each of all sub-pixels has the same value of '0', and thus a compressed bitstream in the copy mode may not include a separate code as illustrated in FIG. 12.

Further, in some embodiments, the plurality of encoding modes may further include a specific pattern mode that encodes the block stress data BSD to a specific value when the block stress data BSD is specific pattern data. In an embodiment, it may be determined whether the block stress data BSD is the specific pattern data, and it may be determined whether the specific pattern mode is the available encoding mode (S155) as shown in FIG. 1.

In some embodiments, the specific pattern data may include white pattern data having the same value for all sub-pixels included in the pixel block. That is, it may be determined whether the block stress data BSD is the white pattern data. If the block stress data BSD is the white pattern data, it may be determined that a white mode is the available encoding mode for the block stress data BSD (S160). In an embodiment, for example, as illustrated in FIG. 7A, when all the stress data RSD, GSD and BSD for all sub-pixels included in the pixel block have a same value VAL, the block stress data BSD may be determined to be the white pattern data, and the white mode may be determined as the available encoding mode.

In an embodiment, the specific pattern data may include check pattern data having a same value for the same color sub-pixels included in the pixel block. That is, it may be determined whether the block stress data BSD is the check pattern data. If the block stress data BSD is the check pattern data, it may be determined that a check mode is the available encoding mode for the block stress data BSD (S165). In an embodiment, for example, as illustrated in FIG. 7B, when all the stress data RSD for red sub-pixels included in the pixel block have a same first value VAL1, all the stress data GSD for green sub-pixels included in the pixel block have a same second value VAL2, and all the stress data BSD for blue sub-pixels included in the pixel block have a same third value VAL3, the block stress data BSD may be determined to be the check pattern data, and the check mode may be determined as the available encoding mode.

In an embodiment, a final encoding mode may be selected among the available encoding modes based on quantization values of the available encoding modes (S170), as shown in FIG. 1. In some embodiments, an available encoding mode having the lowest quantization value among the available encoding modes may be selected as the final encoding mode. For example, in the method of compressing the stress data according to embodiments, as illustrated in FIG. 8, twenty-six encoding modes having mode numbers from 0 to 15 and in which the entropy coding is selectively performed may be used. In an embodiment, for example, in a case where all the twenty-six encoding modes illustrated in FIG. 8 are the available encoding modes, one of the copy mode, the white mode, the check mode and the DPCM mode having mode numbers from 0 to 3 and a quantization value of 0 may be selected as the final encoding mode. In an embodiment, for example, the copy mode having the lowest mode number of 0 may be selected as the final encoding mode, but is not limited thereto.

In another embodiment, for example, in a case where seven encoding modes having mode numbers from 0 to 4 are not the available encoding modes, and twenty-one encoding modes having mode numbers from 5 to 15 are the available encoding modes, one of the DPCM mode and the entropy coding mode having a mode number of 5 and the lowest quantization number of 2 among the twenty-one encoding modes may be selected as the final encoding mode. In this case, the code length of the DPCM mode with the quantization value of 2 and the code length of the entropy coding mode with the quantization value of 2 may be compared with each other, and the encoding mode having a smaller code length between the DPCM mode and the entropy coding mode may be selected as the final encoding mode.

In an embodiment, the PCM code PCM_CODE generated in PCM mode with a quantization value of 7 may have one bit for each sub-pixel, and may have only twenty-four bits for the pixel block. Thus, the PCM mode having the mode number of 15 and the quantization value of 7 may always be the available encoding mode. Therefore, if all other encoding modes are not the available encoding modes, the PCM mode having the mode number of 15 may be selected as the final encoding mode.

In some embodiments, the final encoding mode may be selected in a way such that a quantization value for a current pixel block is not reduced by more than a reference difference compared with a quantization value for a previous pixel block. Accordingly, defects in a compensated image caused by an excessive difference in quantization values between adjacent pixel blocks may be effectively prevented. In an embodiment, for example, as illustrated in FIG. 1, the lowest quantization value LQV among the quantization values of the available encoding modes may be checked (S175), and a difference between a previous quantization value PQV of a final encoding mode for a previous pixel block and the lowest quantization value LQV may be compared with a reference quantization difference value RQV (S180). If a value obtained by subtracting the lowest quantization value LQV from the previous quantization value PQV is less than or equal to the reference quantization difference value RQV (S180: NO), an available encoding mode having the lowest quantization value LQV among the available encoding modes may be selected as the final encoding mode (S185). If the value obtained by subtracting the lowest quantization value LQV from the previous quantization value PQV is greater than the reference quantization difference value RQV (S180: YES), an available encoding mode having a quantization value higher than the lowest quantization value LQV among the available encoding modes may be selected as the final encoding mode (S190). For example, if the previous quantization value PQV is 5, the lowest quantization value LQV is 2, and the reference quantization difference value RQV is 2, even if an encoding mode having a quantization value of 2 is the available encoding mode, an available encoding mode having a quantization value of 3 may be selected as the final encoding mode.

In an embodiment, a compressed bitstream for the pixel block may be generated based on the compressed code corresponding to the final encoding mode among the plurality of compressed codes (i.e., a compression code encoded in the final encoding mode) (S195) as shown in FIG. 1. In some embodiments, the compressed bitstream for the pixel block may include a mode bit representing the final encoding mode.

In an embodiment, for example, when the final encoding mode is the PCM mode, as illustrated in FIG. 9, the compressed bitstream BS for the pixel block may include the mode bit MB indicating the PCM mode, and the PCM code PCM_CODE having one bit for each sub-pixel included in the pixel block. In some embodiments, as illustrated in FIG. 8, the plurality of encoding modes may have mode numbers from 0 to 15, and the mode bit MB may have fourth bits to represent the mode numbers from 0 to 15. Further, as illustrated in FIG. 8, since the PCM mode has a quantization value of 7, the PCM code PCM_CODE may have one bit for each sub-pixel.

In an embodiment, when the final encoding mode is the DPCM mode (or the color difference DPCM mode), as illustrated in FIG. 10, the compressed bitstream BS for the pixel block may include the mode bit MB indicating the DPCM mode (or the color difference DPCM mode), an intra prediction mode bit IPMB indicating the direction in which the DPCM code DPCM_CODE is calculated among the vertical direction, the horizontal direction, the right-down direction and the left-down direction, an entropy coding bit ECB having a value of 0 indicating that the entropy coding was not performed, and the DPCM code DPCM_CODE having two bits for each sub-pixel included in the pixel block. The DPCM mode that generates the DPCM code DPCM_CODE may be the available encoding mode when the DPCM code DPCM_CODE has one of four values that can be expressed in two bits with respect to each of all sub-pixels included in the pixel block. Alternatively, when the DPCM code DPCM_CODE for the sub-pixels has more than four values, the DPCM mode that generates the DPCM code DPCM_CODE may not be the available encoding mode, and the DPCM mode may not be selected as the final encoding mode.

In an embodiment, when the final encoding mode is the entropy coding mode, as illustrated in FIG. 11, the compressed bitstream BS for the pixel block may include the mode bit MB indicating the entropy coding mode, the intra prediction mode bit IPMB indicating the direction in which the DPCM code DPCM_CODE is calculated among the vertical direction, the horizontal direction, the right-down direction and the left-down direction, the entropy coding bit ECB having a value of 1 indicating that the entropy coding was performed on the DPCM code DPCM_CODE, and the entropy code ENTROPY_CODE generated by the entropy coding and having a variable number of bits for each sub-pixel included in the pixel block.

In an embodiment, when the code length of the entropy code ENTROPY_CODE is equal to the number of sub-pixels included in the pixel block, the copy mode may be determined as the final encoding mode. When the final encoding mode is the copy mode, as illustrated in FIG. 12, the compressed bitstream BS for the pixel block may include the mode bit MB indicating the copy mode, and the intra prediction mode bit IPMB indicating the direction in which the DPCM code DPCM_CODE is calculated among the vertical direction, the horizontal direction, the right-down direction and the left-down direction. The PCM code PCM_CODE of the block stress data BSD that is compressible in the copy mode may be substantially the same as the predictive PCM code PCODE, and thus the compressed bitstream BS may be restored to the block stress data BSD without data loss even if the compressed bitstream BS does not include the PCM code PCM_CODE, the DPCM code DPCM_CODE and the entropy code ENTROPY_CODE.

In an embodiment, when the block stress data BSD is the white pattern data in which the stress data for all sub-pixels included in the pixel block have the same value, the white mode may be determined as the final encoding mode. When the final encoding mode is the white mode, as illustrated in FIG. 13, the compressed bitstream BS for the pixel block may include the mode bit MB indicating the white mode, and a value bit VB indicating the same value. The value bit VB may have eight bits, but is not limited thereto.

In an embodiment, when the block stress data BSD is the check pattern data having a same first value for the first color sub-pixels (e.g., the red sub-pixels) included in the pixel block, a same second value for the second color sub-pixels (e.g. the green sub-pixels) included in the pixel block, and a same third value for the third color sub-pixels (e.g. the blue sub-pixels) included in the pixel block, the check mode may be determined as the final encoding mode. When the final encoding mode is the check mode, as illustrated in FIG. 14, the compressed bitstream BS for the pixel block may include the mode bit MB indicating the check mode, a first value bit VB1 indicating the first value, a second value bit VB2 indicating the second value, and a third value bit VB3 indicating the third value. Each of the first, second and third value bits VB1, VB2 and VB3 may have eighth bits, but is not limited thereto.

As described above, in the method of compressing the stress data according to embodiments, the block stress data BSD for each pixel block may be encoded in an optimal encoding mode among the plurality of encoding modes (e.g., the PCM mode, the DPCM mode, the entropy coding mode, the color difference DPCM mode, the copy mode, the white mode and the check mode). In such embodiments, since the stress data is compressed into the compressed bitstream BS while minimizing the data loss, and the compressed bitstream BS is stored in a stress data memory instead of the stress data, the size of the stress data memory may be minimized.

FIG. 15 is a block diagram illustrating an encoder for compressing stress data in a display device according to embodiments.

Referring to FIG. 15, an encoder 200 that compresses stress data in a display device according to embodiments may include a plurality of encoding circuits 210, 220 and 230, a rate control circuit 250, and a bitstream generation circuit 260. In some embodiments, the encoder 200 may further include a pattern determination circuit 240.

The encoder 200 may generate a plurality of compressed codes PCM_CODE, DPCM_CODE and ECODE by encoding block stress data BSD for each pixel block in a plurality of encoding modes. In some embodiments, the plurality of encoding circuits 210, 220 and 230 of the encoder 200 may include a PCM circuit 210, a DPCM circuit 220 and an entropy coding circuit 230.

The PCM circuit 210 may generate a PCM code PCM_CODE by performing a quantization operation on the block stress data BSD. Here, the quantization operation may be an operation of removing a number of lower bits corresponding to a quantization value from the stress data for each sub-pixel included in the block stress data BSD. The PCM circuit 210 may provide the PCM code PCM_CODE to the DPCM circuit 220 and the bitstream generation circuit 260.

The DPCM circuit 220 may generate a DPCM code DPCM_CODE based on the PCM code PCM_CODE and a predictive PCM code PCODE. In some embodiments, the DPCM circuit 220 may further generate a color difference DPCM code based on the DPCM code DPCM_CODE. In some embodiments, the DPCM circuit 220 may include a reconstruction circuit 222, a prediction circuit 224 and a subtractor 226.

The reconstruction circuit 222 may generate reconstructed block stress data RBSD for an adjacent pixel block by reconstructing a compressed bitstream BS (or the DPCM code DPCM_CODE) for the adjacent pixel block adjacent to the pixel block. In some embodiments, the reconstruction circuit 222 may perform a dithering operation to add lower bits that were removed by the quantization operation to the reconstructed block stress data RBSD.

The prediction circuit 224 may determine a direction in which the DPCM code DPCM_CODE for the pixel block is calculated based on the PCM code PCM_CODE for the pixel block (or the block stress data BSD for the pixel block) and the reconstructed block stress data RBSD for the adjacent pixel block, and may provide the subtractor 226 with an intra prediction mode bit indicating the determined direction and the predictive PCM code PCODE corresponding to the determined direction. In an embodiment, for example, the prediction circuit 224 may (previously) calculate DPCM codes DPCM_CODE for the pixel block in a vertical direction, a horizontal direction, a right-down direction and a left-down direction, and may select a direction in which a value of the DPCM code DPCM_CODE for the pixel block (e.g., a maximum value or an average value of the DPCM codes DPCM_CODE for sub-pixels included in the pixel block) is minimized among the vertical direction, the horizontal direction, the right-down direction and the left-down direction.

The subtractor 226 may generate the DPCM code DPCM_CODE for the pixel block based on the PCM code PCM_CODE for the pixel block and the predictive PCM code PCODE for the adjacent pixel block. In an embodiment, for example, the subtractor 226 may generate the DPCM code DPCM_CODE for each pixel by subtracting the predictive PCM code PCODE (or the PCM code PCM_CODE) for an adjacent pixel from the PCM code PCM_CODE for the pixel. The subtractor 226 may provide the DPCM code DPCM_CODE to the entropy coding circuit 230 and the bitstream generation circuit 260, and may provide a code length DPCM_CL of the DPCM code DPCM_CODE to the rate control circuit 250.

The entropy coding circuit 230 may generate an entropy code ECODE by performing entropy coding on the DPCM code DPCM_CODE. In some embodiments, the entropy coding circuit 230 may perform Golomb coding as the entropy coding, but is not limited thereto. The entropy coding circuit 230 may provide the entropy code ECODE to the bitstream generation circuit 260, and may provide a code length ECODE_CL of the entropy code ECODE to the rate control circuit 250.

Although FIG. 15 illustrates an embodiment in which the encoder 200 includes the PCM circuit 210, the DPCM circuit 220 and the entropy coding circuit 230, in other embodiments, encoding circuits included in the encoder 200 are not limited to the example of FIG. 15. In an embodiment, for example, the encoder 200 may further include a run length coding circuit, a Huffman coding circuit, an ADPCM circuit, etc.

The pattern determination circuit 240 may determine whether the block stress data BSD is at least one selected from white pattern data having a same value for all sub-pixels included in the pixel block, and check pattern data having a same value for the same color sub-pixels included in the pixel block. When the block stress data BSD is the white pattern data, the pattern determination circuit 240 may notify the rate control circuit 250 that the white mode is an available encoding mode, and may provide the same value for all sub-pixels to the bitstream generation circuit 260. Further, when the block stress data BSD is the check pattern data, the pattern determination circuit 240 may notify the rate control circuit 250 that the check mode is an available encoding mode, and may provide the same values for respective color sub-pixels to the bitstream generation circuit 260.

The rate control circuit 250 may determine whether the plurality of encoding modes are available encoding modes for the block stress data BSD based on the code lengths DPCM_CL and ECODE_CL of the plurality of compressed codes DPCM_CODE and ECODE and the number of available bits for the pixel block. In some embodiments, the number of available bits for the pixel block may correspond to a sum of the number of unused bits for a previous pixel block and the number of bits allocated to the pixel block. In an embodiment, for example, if the code length DPCM_CL of the DPCM code DPCM_CODE is less than or equal to the number of available bits, it may be determined that the DPCM mode is the available encoding mode. In such an embodiment, if the code length ECODE_CL of the entropy code ECODE is less than or equal to the number of available bits, it may be determined that the entropy coding mode is the available encoding mode. Since the code length of the PCM code PCM_CODE is fixed according to the quantization value, the code length of the PCM code PCM_CODE may not be compared with the number of available bits, and the PCM mode having a predetermined quantization value (e.g., a quantization value of 7 as illustrated in FIG. 8) may always be determined to be the available encoding mode. In an embodiment, the white mode may be determined to be the available encoding mode depending on whether the block stress data BSD is the white pattern data, and the check mode may be determined to be the available encoding mode depending on whether the block stress data BSD is the check pattern data. In some embodiments, the rate control circuit 250 may further determine whether the copy mode is the available encoding mode by comparing the code length ECODE of the entropy code ECODE with the number of sub-pixels included in the pixel block.

In an embodiment, the rate control circuit 250 may select a final encoding mode among the available encoding modes based on quantization values of the available encoding modes, and may provide a mode selection signal MS indicating the final encoding mode to the bitstream generation circuit 260. In some embodiments, the rate control circuit 250 may select an available encoding mode having the lowest quantization value among the available encoding modes as the final encoding mode. In other embodiments, the rate control circuit 250 may select an available encoding mode having a quantization value higher than the lowest quantization value as the final encoding mode when the lowest quantization value is lower by more than a reference quantization difference value than a previous quantization value of a final encoding mode for a previous pixel block.

The bitstream generation circuit 260 may generate a compressed bitstream BS for the pixel block based on the compressed code encoded in the final encoding mode. In an embodiment, for example, when the final encoding mode is the PCM mode, the bitstream generation circuit 260 may generates the compressed bitstream BS including a mode bit MB and a PCM code PCM_CODE as illustrated in FIG. 9. In an embodiment, for example, when the final encoding mode is the DPCM mode (or a color difference DPCM mode), the bitstream generation circuit 260 may generate the compressed bitstream BS including the mode bit MB, an intra prediction mode bit IPMB, an entropy coding bit ECB and a DPCM code DPCM_CODE as illustrated in FIG. 10. In an embodiment, for example, when the final encoding mode is the entropy coding mode, the bitstream generation circuit 260 may generate the compressed bitstream BS including the mode bit MB, the intra prediction mode bit IPMB, the entropy coding bit ECB and an entropy code ENTROPY_CODE as illustrated in FIG. 11. In an embodiment, for example, when the final encoding mode is the copy mode, the bitstream generation circuit 260 may generate the compressed bitstream BS including only the mode bit MB and the intra prediction mode bit IPMB as illustrated in FIG. 12. In an embodiment, for example, when the final encoding mode is the white mode, the bitstream generation circuit 260 may generate the compressed bitstream BS including the mode bit MB and a value bit VB as illustrated in FIG. 13. In an embodiment, for example, when the final encoding mode is the check mode, the bitstream generation circuit 260 may generate a compressed bitstream BS including the mode bit MB, a first value bit VB1, a second value bit VB2 and a third value bit VB3 as illustrated in FIG. 14.

As described above, the encoder 200 according to embodiments may compress the block stress data BSD for each pixel block in an optimal encoding mode among the plurality of encoding modes (e.g., the PCM mode, the DPCM mode, the entropy coding mode, the color difference DPCM mode, the copy mode, the white mode and the check mode). In such embodiments, since the stress data is compressed into the compressed bitstream BS while minimizing the data loss, and the compressed bitstream BS is stored in a stress data memory instead of the stress data, the size of the stress data memory may be minimized.

Figure 16:
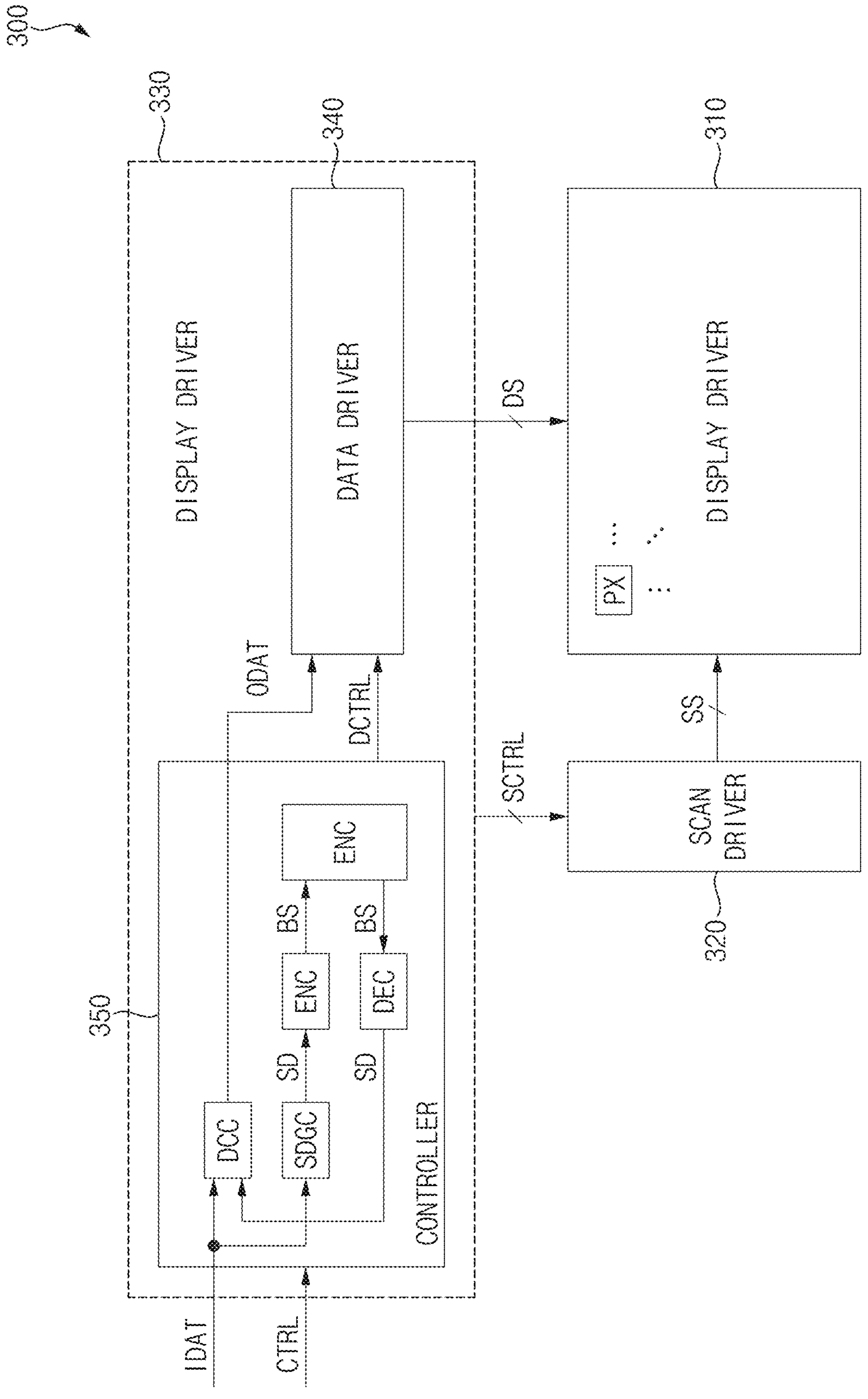
FIG. 16 is a block diagram illustrating a display device according to embodiments.

FIG. 16 is a block diagram illustrating a display device according to embodiments.

Referring to FIG. 16, a display device 300 according to embodiments may include a display panel 310 including a plurality of pixels PX, a scan driver 320 that provides scan signals SS to the plurality of pixels PX, and a display driver 330 that drives the display panel 310. The display driver 330 may include a data driver 340 that provides data signals DS to the plurality of pixels PX, and a controller 350 that controls an operation of the display device 300. In some embodiments, the controller 350 may include a stress data generation circuit SDGC, an encoder ENC, a stress data memory SDM, a decoder DEC and a data compensation circuit DCC.

The display panel 310 may include a plurality of data lines, a plurality of scan lines, and the plurality of pixels PX connected to the plurality of data lines and the plurality of scan lines. In some embodiments, each pixel PX may include a light emitting element, and the display panel 310 may be a light emitting display panel. In an embodiment, for example, the light emitting element may be, but is not limited to, an organic light emitting diode (OLED), a nano light emitting diode (NED), a quantum dot (QD) light emitting diode, a micro-light emitting diode, an inorganic light emitting diode, or any other suitable light emitting device. In other embodiments, the display panel 310 may be a liquid crystal display (LCD) panel, or any other suitable display panel.

The scan driver 320 may generate the scan signals SS based on a scan control signal SCTRL received from the controller 350, and may sequentially provide the scan signals SS to the plurality of pixels PX through the plurality of scan lines on a row-by-row basis. In some embodiments, the scan control signal SCTRL may include, but is not limited to, a scan start signal and a scan clock signal. In some embodiments, the scan driver 320 may be integrated or formed in the display panel 310. In other embodiments, the scan driver 320 may be implemented as one or more integrated circuits.

The data driver 340 may generate the data signals DS based on the output image data ODAT and the data control signal DCTRL received from the controller 350, and may provide the data signals DS to the plurality of pixels PX through the plurality of data lines. In some embodiments, the data control signal DCTRL may include, but is not limited to, an output data enable signal, a horizontal start signal, and a load signal. In some embodiments, the display driver 330 including the data driver 340 and the controller 350 may be implemented as a single integrated circuit, and the single integrated circuit may be referred to as a timing controller embedded data driver (TED) integrated circuit. In other embodiments, the data driver 340 and the controller 350 may be implemented as separate integrated circuits.

The controller 350 (e.g., a timing controller) may receive input image data IDAT and a control signal CTRL from an external host processor (e.g., an application processor (AP), a graphics processing unit (GPU) or a graphics card). In some embodiments, the input image data IDAT may be RGB image data including red image data, green image data and blue image data. In some embodiments, the control signal CTRL may include, but is not limited to, a vertical synchronization signal, a horizontal synchronization signal, an input data enable signal and a master clock signal. The controller 350 may generate the output image data ODAT by compensating the input image data IDAT based on stress data SD. Further, the controller 350 may control an operation of the data driver 340 by providing the output image data ODAT and the data control signal DCTRL to the data driver 340, and may control an operation of the scan driver 320 by providing the scan control signal SCTRL to the scan driver 320.

In the display device 300 according to embodiments, the display driver 330 or the controller 350 may generate a compressed bitstream BS by compressing or encoding the stress data SD, may store the compressed bitstream BS, may restore the stress data SD by decoding the stored compressed bitstream BS, and may generate the output image data ODAT by compensating the input image data IDAT based on the restored stress data SD. To perform these operations, the controller 350 may include the stress data generation circuit SDGC, the encoder ENC, the stress data memory SDM, the decoder DEC and the data compensation circuit DCC.

The stress data generation circuit SDGC may generate the stress data SD by accumulating the input image data IDAT. The encoder ENC may encode the stress data SD to generate the compressed bitstream BS. The encoder ENC may be an encoder 200 illustrated in FIG. 15. The stress data memory SDM may store the compressed bitstream BS. In the display driver 330 and the display device 300 according to embodiments, the compressed bitstream BS may be stored in the stress data memory SDM instead of the stress data SD, and thus a size of the stress data memory SDM may be minimized.

The decoder DEC may read the compressed bitstream BS from the stress data memory SDM, and may decode the read compressed bitstream BS to restore the stress data SD. The data compensation circuit DCC may generate the output image data ODAT by compensating the input image data IDAT based on the restored stress data SD. The data driver 340 may provide the data signals DS to the plurality of pixels PX based on the output image data ODAT. Accordingly, degradation of the plurality of pixels PX may be compensated, and an afterimage may be effectively prevented in the display device 300.

Figure 17:
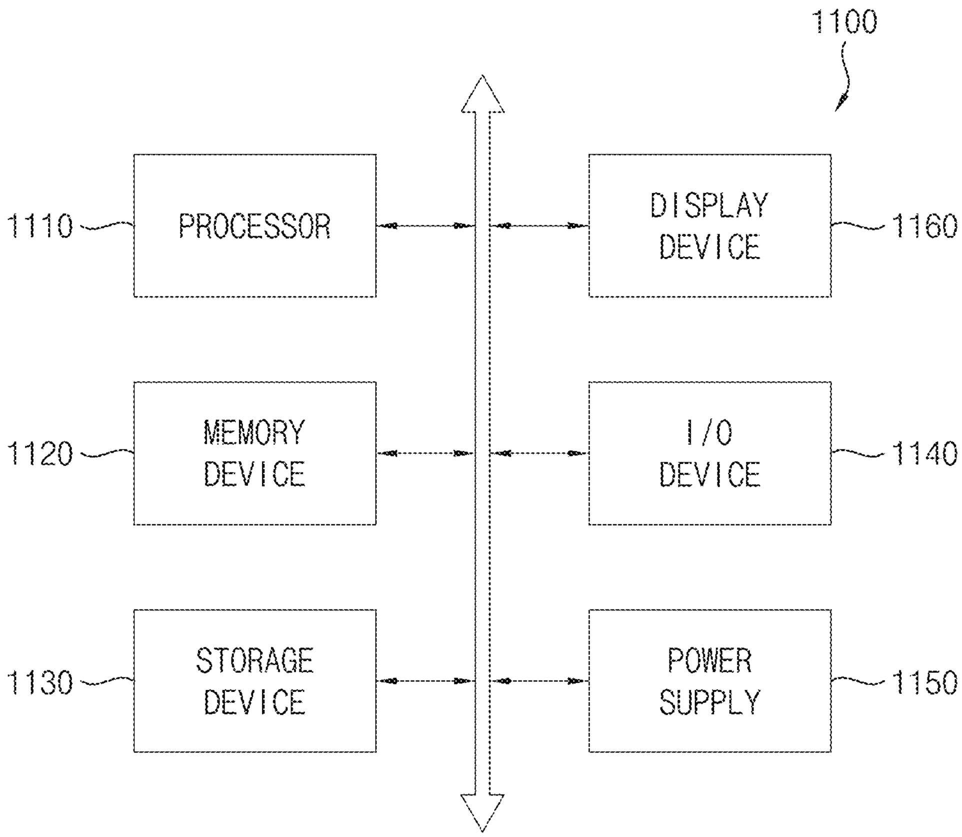
FIG. 17 is a block diagram illustrating an electronic device including a display device according to embodiments.

FIG. 17 is a block diagram illustrating an electronic device including a display device according to embodiments.

Referring to FIG. 18, an embodiment of an electronic device 1100 may include a processor 1110, a memory device 1120, a storage device 1130, an input/output (I/O) device 1140, a power supply 1150 and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro-processor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, block stress data for each pixel block may be compressed in an optimal encoding mode among a plurality of encoding modes. Further, when the block stress data is specific pattern data, a compress bitstream containing a specific value rather than a compressed code may be generated. Accordingly, a size of a stress data memory may be minimized while minimizing a data loss of stress data.

Embodiments of the inventions may be applied any electronic device 1100 including the display device 1160, for example, a television (TV), a digital TV, a three-dimensional (3D) TV, a smart phone, a wearable electronic device, a tablet computer, a mobile phone, a personal computer (PC), a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A method of compressing stress data in a display device, the method comprising:

dividing the stress data into block stress data for a pixel block;

generating a plurality of compressed codes by encoding the block stress data in a plurality of encoding modes;

determining whether the plurality of encoding modes are available encoding modes for the block stress data based on code lengths of the plurality of compressed codes and a number of available bits for the pixel block;

selecting a final encoding mode among the available encoding modes based on quantization values of the available encoding modes; and generating a compressed bitstream for the pixel block based on a compressed code corresponding to the final encoding mode among the plurality of compressed codes.

2. The method of claim 1, wherein the plurality of encoding modes differ from each other in at least one selected from an encoding algorithm and a quantization value.

3. The method of claim 1, wherein the generating the plurality of compressed codes by encoding the block stress data in the plurality of encoding modes includes:

generating a pulse code modulation (PCM) code, as one of the plurality of compressed codes, by performing a quantization operation on the block stress data.

4. The method of claim 3, wherein the generating the plurality of compressed codes by encoding the block stress data in the plurality of encoding modes further includes:

generating a predictive PCM code based on reconstructed block stress data for an adjacent pixel block adjacent to the pixel block; and generating a differential PCM (DPCM) code, as one of the plurality of compressed codes, based on the PCM code and the predictive PCM code.

5. The method of claim 4, wherein the generating the plurality of compressed codes by encoding the block stress data in the plurality of encoding modes further includes:

generating an entropy code, as one of the plurality of compressed codes, by performing entropy coding on the DPCM code.

6. The method of claim 5, further comprising:

determining whether a copy mode is an available encoding mode by comparing a code length of the entropy code with a number of sub-pixels included in the pixel block.

7. The method of claim 4, wherein the DPCM code for the pixel block includes a first color DPCM code for first color sub-pixels included in the pixel block, a second color DPCM code for second color sub-pixels included in the pixel block, and a third color DPCM code for third color sub-pixels included in the pixel block, and wherein the generating the plurality of compressed codes by encoding the block stress data in the plurality of encoding modes further includes:

generating a first difference DPCM code by subtracting the first color DPCM code from the second color DPCM code;

generating a second difference DPCM code by subtracting the first color DPCM code from the third color DPCM code; and generating, as one of the plurality of compressed codes, a color difference DPCM code including the first color DPCM code, the first difference DPCM code and the second difference DPCM code.

8. The method of claim 1, wherein the number of available bits for the pixel block corresponds to a sum of a number of unused bits for a previous pixel block and a number of bits allocated to the pixel block.

9. The method of claim 8, wherein the number of bits allocated to the pixel block is determined based on a number of bits of the block stress data and a target compression rate.

10. The method of claim 1, wherein the determining whether the plurality of encoding modes are the available encoding modes includes:

with respect to an encoding mode among the plurality of encoding modes, comparing a code length of a compressed code corresponding to the encoding mode among the plurality of compressed codes with the number of available bits;

when the code length is less than or equal to the number of available bits, determining that the encoding mode is an available encoding mode; and when the code length is greater than the number of available bits, determining that the encoding mode is not the available encoding mode.

11. The method of claim 1, further comprising:

determining whether the block stress data is specific pattern data.

12. The method of claim 11, wherein the specific pattern data includes at least one selected from white pattern data having a same value for all sub-pixels included in the pixel block, and check pattern data having a same value for same color sub-pixels included in the pixel block.

13. The method of claim 1, wherein the selecting the final encoding mode includes:

selecting an available encoding mode having a lowest quantization value among the available encoding modes as the final encoding mode.

14. The method of claim 1, wherein the selecting the final encoding mode includes:

checking a lowest quantization value among the quantization values of the available encoding modes;

comparing a difference between a previous quantization value of a final encoding mode for a previous pixel block and the lowest quantization value with a reference quantization difference value;

when a value obtained by subtracting the lowest quantization value from the previous quantization value is less than or equal to the reference quantization difference value, selecting an available encoding mode having the lowest quantization value among the available encoding modes as the final encoding mode; and when the value obtained by subtracting the lowest quantization value from the previous quantization value is greater than the reference quantization difference value, selecting an available encoding mode having a quantization value higher than the lowest quantization value among the available encoding modes as the final encoding mode.

15. The method of claim 1, wherein the compressed bitstream for the pixel block includes a mode bit representing the final encoding mode.

16. The method of claim 15, wherein, when the final encoding mode is a PCM mode, the compressed bitstream further includes:

a PCM code having one bit for each sub-pixel included in the pixel block.

17. The method of claim 15, wherein, when the final encoding mode is a DPCM mode, the compressed bitstream further includes:

an intra prediction mode bit representing a direction in which a DPCM code is calculated; and the DPCM code having two bits for each sub-pixel included in the pixel block.

18. The method of claim 15, wherein, when the final encoding mode is an entropy coding mode, the compressed bitstream further includes:

an intra prediction mode bit representing a direction in which a DPCM code is calculated; and an entropy code which is generated by performing entropy coding on the DPCM code and has variable bits for each sub-pixel included in the pixel block.

19. The method of claim 15, wherein, when a code length of an entropy code generated by encoding the block stress data in an entropy coding mode among the plurality of encoding modes is equal to a number of sub-pixels included in the pixel block, the final encoding mode is determined as a copy mode, and wherein, when the final encoding mode is the copy mode, the compressed bitstream includes only the mode bit and an intra prediction mode bit.

20. The method of claim 15, wherein, when the block stress data is white pattern data having a same value with respect to all sub-pixels included in the pixel block, the final encoding mode is determined as a white mode, and wherein, when the final encoding mode is the white mode, the compressed bitstream further includes a value bit representing the same value.

21. The method of claim 15, wherein, when the block stress data is check pattern data having a same first value with respect to first color sub-pixels included in the pixel block, a same second value with respect to second color sub-pixels included in the pixel block and a same third value with respect to third color sub-pixels included in the pixel block, the final encoding mode is determined as a check mode, and wherein, when the final encoding mode is the check mode, the compressed bitstream further includes a first value bit representing the same first value, a second value bit representing the same second value and a third value bit representing the same third value.

22. An encoder which compresses stress data in a display device, the encoder comprising:

a plurality of encoding circuits which generates a plurality of compressed codes by encoding block stress data for a pixel block in a plurality of encoding modes;

a rate control circuit which determines whether the plurality of encoding modes are available encoding modes for the block stress data based on code lengths of the plurality of compressed codes and a number of available bits for the pixel block, and selects a final encoding mode among the available encoding modes based on quantization values of the available encoding modes; and a bitstream generation circuit which generates a compressed bitstream for the pixel block based on a compressed code corresponding to the final encoding mode among the plurality of compressed codes.

23. The encoder of claim 22, wherein the plurality of encoding circuits includes:

a pulse code modulation (PCM) circuit which generates a PCM code, as one of the plurality of compressed codes, by performing a quantization operation on the block stress data;

a differential PCM (DPCM) circuit which generates a DPCM code, as one of the plurality of compressed codes based on the PCM code, and a predictive PCM code; and an entropy coding circuit which generates an entropy code, as one of the plurality of compressed codes, by performing entropy coding on the DPCM code.

24. The encoder of claim 22, further comprising:

a pattern determination circuit which determines whether the block stress data is at least one selected from white pattern data having a same value for all sub-pixels included in the pixel block, and check pattern data having a same value for same color sub-pixels included in the pixel block.

25. A display driver of a display device, the display driver comprising:

a stress data generation circuit which generates stress data by accumulating input image data;

an encoder which generates a compressed bitstream by encoding the stress data;

a stress data memory which stores the compressed bitstream;

a decoder which restores the stress data by decoding the compressed bitstream stored in the stress data memory;

a data compensation circuit which generates output image data by compensating the input image data based on the restored stress data; and a data driver which provides data signals to a plurality of pixels of the display device based on the output image data, wherein the stress data is divided into block stress data for each pixel block, and wherein the encoder includes:

a plurality of encoding circuits which generates a plurality of compressed codes by encoding the block stress data in a plurality of encoding modes;

a rate control circuit which determines whether the plurality of encoding modes are available encoding modes for the block stress data based on code lengths of the plurality of compressed codes and a number of available bits for the pixel block, and selects a final encoding mode among the available encoding modes based on quantization values of the available encoding modes; and a bitstream generation circuit which generates the compressed bitstream for the pixel block based on a compressed code corresponding to the final encoding mode among the plurality of compressed codes.

26. A display device comprising:

a display panel including a plurality of pixels;

a scan driver which provides scan signals to the plurality of pixels;

a stress data generation circuit which generates stress data by accumulating input image data;

an encoder which generates a compressed bitstream by encoding the stress data;

a stress data memory which stores the compressed bitstream;

a decoder which restores the stress data by decoding the compressed bitstream stored in the stress data memory;

a data compensation circuit which generates output image data by compensating the input image data based on the restored stress data; and a data driver which provides data signals to the plurality of pixels based on the output image data, wherein the stress data is divided into block stress data for each pixel block, and wherein the encoder includes:

a plurality of encoding circuits which generates a plurality of compressed codes by encoding the block stress data in a plurality of encoding modes;

a rate control circuit which determines whether the plurality of encoding modes are available encoding modes for the block stress data based on code lengths of the plurality of compressed codes and a number of available bits for the pixel block, and to select a final encoding mode among the available encoding modes based on quantization values of the available encoding modes; and a bitstream generation circuit which generates the compressed bitstream for the pixel block based on a compressed code corresponding to the final encoding mode among the plurality of compressed codes.

* * * * *